United States Patent [19]

Takeda et al.

[11] Patent Number: 4,854,843

[45] Date of Patent: Aug. 8, 1989

[54] APPARATUS FOR PRODUCING CAST PRODUCTS

[75] Inventors: Satoru Takeda; Toshihiro Hayashi; Hiroshige Kohno, all of Tokyo, Japan

[73] Assignee: Asahi Denka Kogyo K. K., Tokyo, Japan

[21] Appl. No.: 125,430

[22] Filed: Nov. 25, 1987

[30] Foreign Application Priority Data

Jun. 13, 1987 [JP] Japan ................. 62-147709

[51] Int. Cl.$^4$ ............................................. B28B 13/02
[52] U.S. Cl. ..................................... 425/437; 249/127;
 264/313; 264/314; 425/439; 425/440;
 425/DIG. 14; 425/DIG. 44
[58] Field of Search ............... 249/127, 152, 153;
 264/45.2, 313, 314, DIG. 78; 425/51, 255, 405
 H, 422, 437–440, DIG. 44, 44, 60, 112

[56] References Cited

U.S. PATENT DOCUMENTS

| | | | |
|---|---|---|---|
| 1,124,871 | 7/1928 | Beal | 425/DIG. 44 |
| 1,968,887 | 8/1934 | Hansen | 264/306 |
| 2,182,454 | 8/1937 | Sherman | 249/127 |
| 2,378,701 | 6/1948 | Habib et al. | 264/301 |
| 2,660,776 | 12/1953 | Miller | 249/55 |
| 3,306,965 | 2/1967 | Lucas et al. | 264/306 |
| 3,677,674 | 7/1972 | Bowles | 425/405 H |
| 3,730,666 | 5/1973 | Bowles | 425/405 |
| 3,806,302 | 4/1974 | Airey | 425/DIG. 44 |
| 3,815,863 | 6/1974 | Andeweg | 425/DIG. 44 |
| 3,980,269 | 9/1976 | Maurino et al. | 425/DIG. 44 |
| 3,982,721 | 9/1976 | Maurino et al. | 425/DIG. 44 |
| 4,044,161 | 8/1977 | Tanara | 249/127 |
| 4,051,296 | 9/1977 | Windecker | 264/225 |
| 4,055,620 | 10/1977 | Conrad | 425/DIG. 44 |
| 4,093,175 | 6/1978 | Putzer et al. | 249/153 |

*Primary Examiner*—Jay H. Woo
*Assistant Examiner*—C. Scott Bushey
*Attorney, Agent, or Firm*—Armstrong, Nikaido, Marmelstein, Kubovcik & Murray

[57] ABSTRACT

Apparatus for producing cast products which include a filling unit wherein elastic moulds of open-bag shape are filled with non-solid materials, a solidifying unit wherein the materials are allowed to solidify in the elastic moulds, and a withdrawal unit wherein the solidified materials are withdrawn from the inside of the elastic moulds in the filling unit, the elastic mould is positioned under a vacuum when filling starts. The apparatus provides cast products without mould joint marks, low mould production costs and prevention of mould breakage as well as a great degree of production simplification.

5 Claims, 3 Drawing Sheets

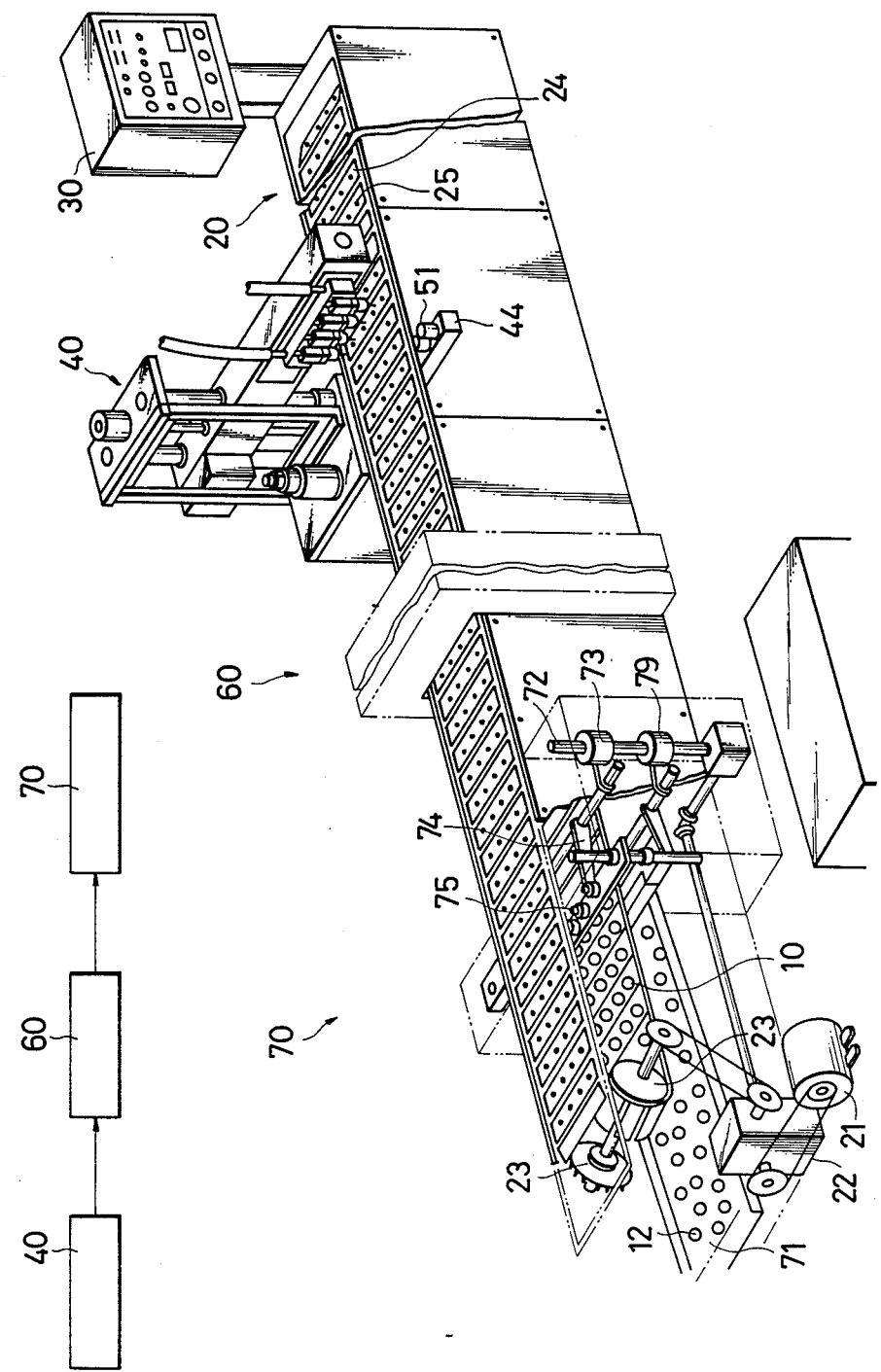

APPARATUS FOR PRODUCING CAST PRODUCTS

BACKGROUND OF THE INVENTION AND RELATED ART STATEMENT

The present invention relates to apparatus for producing cast products and in particular to apparatus for producing cast products, wherein non-solid materials such as water; food stuffs including chocolate paste, fish cake, and fish paste; stationaries such as rubber for erasers; and ordinary utensils such as soap are filled in an elastic mould of open-bag shape, and then solidified to yield products.

A variety of materials including food stuffs have been produced by means of molding. Conventional moulds have been constructed of a plurality of split moulds made of a rigid body. According to these conventional methods for use of split moulds, the materials are first filled into the split moulds to allow to solidify inside the moulds, and then withdrawn by separating the split moulds.

These split moulds, however, tend to leave the joint of the mould on the surface of the product thus formed, resulting in lower product values. A large number of moulds have been required as well as complicated production steps, especially when products of complicated shapes are desired to be formed. Furthermore, since the split mould is made of a rigid body, the manufacture of the split mould itself is so expensive that the product cost tends to be high. Especially when a variety of product types but small production rates are necessary, the cost of the split mould occupies a greater part of the total cost of the product, and this virtually prohibits the actual production of the desired items.

In addition, the split mould made of a rigid body often breaks under a high pressure or a vacuum which may be applied to the mould in the solidification step of a material whose volume changes with temperatures.

OBJECTS AND SUMMARY OF THE INVENTION

An object of the present invention is, therefore, to provide apparatus for producing cast products by the use of an elastic mould of open-bag shape which permits the production of cast products without having such joint marks as appear with split moulds.

Another object of this invention is to provide cast-producing apparatus which can accomplish the reduction of the manufacturing cost of the mould itself and the prevention of the mould damage.

A further object of this invention is to provide apparatus for producing cast products wherein materials can be completely filled into small crevices of a mould of very complicated shape without developing any air bubbles in spite of higher or lower viscosity of the filling material.

In order to solve the aforementioned technical problems, the present invention is characterized in that the apparatus of this invention comprises a filling unit wherein elastic moulds of open-bag shape are filled with non-solid materials, a solidifying unit wherein the materials are allowed to solidify in the elastic moulds, and a withdrawal unit wherein the solidified materials are withdrawn from the inside of the elastic moulds and that the elastic mould in the filling unit is positioned under a vacuum when filling starts.

According to the action of the apparatus of the present invention, materials are first filled into elastic moulds in a filling unit. Elastic moulds are used because filled or solidified materials are withdrawn by expanding or contracting the whole moulds in the filling unit or the withdrawal unit.

The filling into the elastic moulds is carried out when the elastic moulds are positioned under vacuum. Therefore, at the stage of filling, almost no air is present inside the filling section of open-bag shape, and air bubble entrainment or formation in the filling material filled in the filling section can be prevented simply by maintaining the filling material free from the air before filling starts.

Furthermore, the filling section of open-bag shape can be expanded by applying more vacuum in the opposite side of the entrance of the elastic mould than in the inside of the elastic mould of open-bag shape. According to the action of the apparatus of this invention, filling is performed into the moulds thus expanded and afterwards the elastic moulds returns to the original size by equalizing the degrees of vacuum in both sides slowly after or during the filling step. This action beneficially permits the filling into the mould of more elaborate shape.

After being filled into the elastic mould, the material is then solidified in the solidifying unit, which may be a heating or refrigeration unit, depending on the property of the filling material.

Then, the material thus solidified inside the elastic mould is removed from the inside of the elastic mould in the withdrawal unit by expanding the elastic mould.

A vacuum can be developed in the opposite side of the entrance of the elastic mould in order to expand the elastic mould to withdraw the product. Alternatively, the product can be withdrawn by pushing it from the opposite side of the elastic mould entrance.

BRIEF DESCRIPTION OF THE DRAWINGS

The drawings illustrate an example embodying the present invention.

FIG. 1 is a block diagram of apparatus.

FIG. 2 is a perspective view.

DETAILED DESCRIPTION OF PREFERRED EMBODIMENTS

Figure 3:
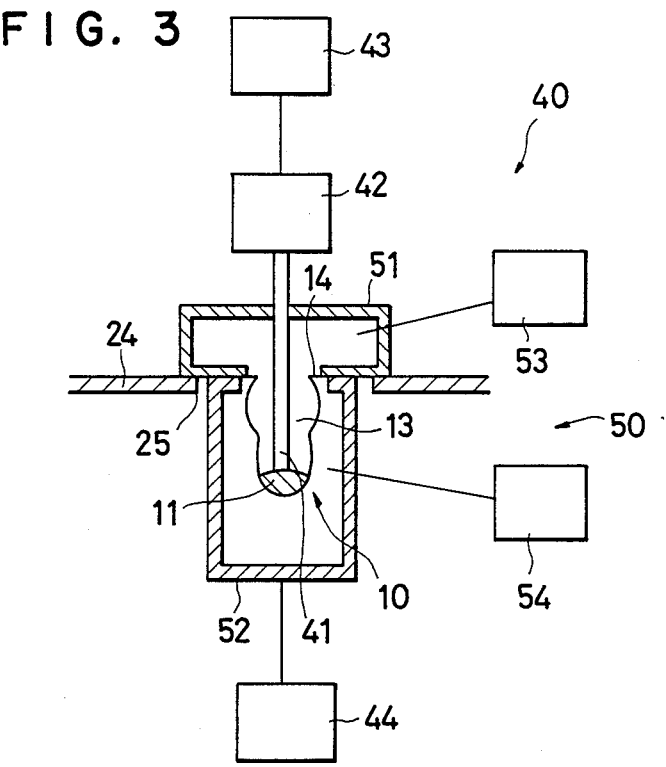
FIG. 3 is a schematic illustration to show a filling unit.
Figure 4:
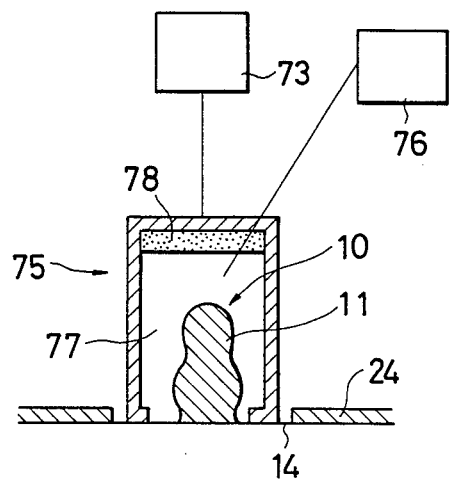
FIG. 4 is a schematic illustration of a withdrawal unit.

Examples of the present invention will be described hereinafter with reference to the drawings. FIG. 1 is a block diagram to depict the configuration of the apparatus. FIG. 2 is a partial perspective view. FIGS. 3 and 4 are provided to illustrate each unit individually.

The present invention comprises a filling unit 40 wherein a filling material 11 is filled into an elastic mould 10, a solidifying unit 60 wherein the material 11 filled in the elastic mould 10 is solidified, and a withdrawal unit 70 wherein the filling material 11 solidified inside the elastic mould 10 is withdrawn. These units 40, 60, and 70 are successively arranged along a transfer conveyor 20, and are controlled with a control unit 30.

The transfer conveyor 20 is driven by a pulley 23 connected with a motor 21 via a reducer 22 and intermittently travels between each unit 40, 60, and 70 at a velocity preset with the control unit 30.

In addition, a number of fixing sheets 24 fixed in the transfer conveyor 20 are placed parallel to the direction of conveyor travel. Each fixing sheet 24 has a fixing hole 25 larger than the size of the final product 12.

The elastic mould 10 comprises an open-bag shaped filling section 13 and a fixing member 14 formed near the open edge of the filling section 13.

The shape of the filling section 13 is spherical, cylindrical, or patterns of animals or specific characters, and the filling material 11 filled inside the filling section 13 takes the shape of the sphere, cylinder or patterns of the animals or the specific characters after the material is solidified.

The fixing member 14 is a flange extending from the filling section 13 and fixed in the fixing sheet 24 of the transfer conveyor 20 in order to facilitate the filling material 11 to be filled inside the filling section 13.

FIG. 3 illustrates an example of the filling unit 40.

In this example, filling in the filling unit 40 is carried out under a vacuum using a vacuum mechanism 50. Both mouth and bottom sections of the elastic mould 10 are placed under a vacuum.

The vacuum mechanism 50 possesses an upper cover 51 connected with an upper vacuum source 53, and a lower cover 52 connected with a lower vacuum source 54. The elastic mould 10 is so positioned that it opens its mouth up-wardly with the filling section 13 hanging down from the fixing sheet 24. The upper cover 51 approaches to the elastic mould from above by actuating a first vertical motion mechanism 43 while the lower cover 52 approaches to the elastic mould from below by actuating a second vertical motion mechanism 44. In FIG. 3, a filling nozzle 41 connected with a filling mechanism 42 is fixed to the upper cover 51 so that the filling nozzle 41 moves up and down simultaneously with the upper cover 51.

The upper and lower covers 51 and 52 move in such a manner that the elastic mould 10 is grasped between both of the covers so that the flow of air to and from the covers 51 and 52 is almost absent since packings (not shown) between the covers tightly shut the air.

The upper vacuum source 53 and lower vacuum source 54 are equipped with such obvious items as vacuum pumps, valves, and pressure gauges (not shown). After the elastic mould 10 is tightly grasped between the upper cover 51 and lower cover 52, the upper vacuum source 53 and lower vacuum source 54 are operated to develop a vacuum inside the upper cover 51 and lower cover 52. Thus, almost no air is present inside the filling section 13 of open-bag shape. Degrees of vacuum are dependent upon the nature of the filling material 11 and are preferable less than those at which volatile components contained in the filling material 11 evaporate or cause forming.

Hence, when a filling material 11 is filled into the inside of a filling section 13 according to the manners as described above, it is possible to conduct filling without air bubbles trapped in the filling material 11. Therefore, it is needless to contract the filling section 13 by means of, for example, pressure in order to prevent air from being entrained in the filling material.

In the above description, it is stated that the filling nozzle 41 is fixed to the upper cover 51 and that the filling nozzle 41 moves together with the upper cover 51. However, another configuration is also possible where a vertical motion mechanism for the filling nozzle 41 is independent of the first vertical motion mechanism 43 used for the upper cover 51.

Furthermore, both of the covers 51 and 52 can be integrally constructed though it has been stated that the elastic mould 10 is covered with both of the upper cover 51 and lower cover 52 to be placed under a vacuum.

In the previous statement, the upper vacuum source 53 and lower vacuum source 54 are independent of each other. However, the vacuum source can be common and a vacuum is developed in both of the upper cover 51 and lower cover 52 which are connected with the common vacuum source via a branch pipe.

Degrees of vacuum can be changed for the chambers covered with the upper cover 51 and lower cover 52. When more vacuum is applied for the lower cover 52 the elastic mould 10 expands as it is filled with the filling material 11. After being filled, the elastic mould 10 returns to the original size by equalizing the degrees of vacuum or by putting the pressure back to atmospheric pressure. As the elastic mould 10 returns to the original size, the force of contraction pushes the filling material 11 to the smallest crevices of the filling section 13, and this permits the filling into an elastic mould of more elaborate shape.

When degrees of vacuum are changed for the upper cover 51 and lower cover 52, vacuums can be developed separately with the use of the upper vacuum source 53 and lower vacuum source 54 as described in this example. Alternatively a single vacuum source can be used with suitable valves to provide a vacuum difference.

For a high-viscosity filling material 11, even if the air contained in the elastic mould 10 is little because of vacuum, air bubbles may form which result in cast products with cavities. This is especially true when the filling material 11 is filled into the inside of the filling section 13 of the elastic mould 10 directly through a filling nozzle 41 placed near the mouth of the elastic mould 10.

In this case, the following modification can be made. First, a first vertical motion mechanism 43 for the upper cover 51 is constructed as a separate assembly which is independent of the nozzle vertical motion mechanism for the filling mechanism 42 including the filling nozzle 41. Then, both of the vertical motion mechanisms are controlled in such manners as described hereinafter.

The filling nozzle 41 of the filling mechanism 42 is made to penetrate through the upper cover 51, lowered in the vicinity of the bottom of the filling section 13 of the elastic mould 10 over the transfer conveyor 20 by means of the vertical motion mechanism 43 to fill the mould partly, and then only the filling nozzle 41 is lifted slowly by the action of the nozzle vertical motion mechanism while filling the material and keeping the upper cover 51 in the same position.

Therefore, in this instance, there must be a certain corresponding relationship between a filling velocity of the filling mechanism 42 and a upward velocity of the nozzle vertical motion mechanism. In addition, whenever an elastic mould whose cross-sectional areas change with the height is used, both of the aforementioned velocities must be changed. This velocity change can be accomplished with cam devices. Since the change of cam devices in conjunction of the change of elastic moulds is troublesome, it is preferable that the two variables; a rate of the filling material per unit time and a velocity of the vertical motion is simultaneously controlled with a programmed control system.

Alternatively, the filling mechanism 42 may stay in its original position while the elastic mould 10 is moved up and down with the vertical motion mechanism (not shown).

When such units or components are assembled in a production line, the elastic mould 10 may stay to be filled by the filling unit 40 and then may be transferred intermittently after completing the filling operation. Alternatively, the filling unit 40 may be transferred along the production line to fill the filling material 11 from the filling unit 40.

A solidifying unit 60 is used to solidify a filling material 11 inside the elastic mould 10.

This unit is composed of a heating mechanism, a cooling mechanism, a combination of these mechanisms, or other mechanisms.

The specific configuration of the solidifying unit 60 is dependent on the material of which the filling material 11 is made.

When the filling material 11 is a substance which can solidify upon cooling, fat, butter, margarine, chocolate, cheese, jelly, ice cream, or water, for example, the solidifying unit 60 can be a cooling unit.

Conversely, when the filling material 11 is a substance which can solidify upon heating, a solution of protein, fish cake or paste, or rubber for an eraser, for example, the solidifying unit 60 can be a heating unit.

When the filling material 11 is a food-stuff, cooking is often necessary as well as the step of heating the material 11. A cooking unit can then be used in combination with the solidifying unit 60.

According to the present invention, the mould 10 is so elastic that it will not break upon solidification in the solidifying unit 60 even if the material 11 changes its volume. On the other hand, when the mould is made of a rigid body, it sometimes breaks because of such internal-pressure increase as encountered in water solidifcation by cooling. In the present invention, however, no damage or rupture will occur because the elastic mould 10 can expand as its volume increases.

FIG. 4 shows a withdrawal unit 70 where the solidified product 12 is withdrawn from the inside of the filling section 13 of the elastic mould 10.

In this withdrawal unit 70, the product 12 can be pushed out by pushing the product 12 from the opposite side of the opening of the elastic mould 10 because of its elasticity.

Alternatively, the open edge can be extended by an external force before the product 12 is pushed out from the opposite side of the open edge.

However, whichever method may be employed, a part of the product corresponding to the opposite side of the opening sometimes undergoes deformation by the action of the pushing force.

In order to solve this problem, the following withdrawal unit can be used in which no single part of the product 12 is affected by an external force.

In this type of a withdrawal unit 70, the filling section 13 located underneath the fixing sheet 24 of a transfer conveyor 20 is turned around by a pulley 23 so as to be positioned above the fixing sheet 24, and the cast product 12 inside the mould 10 is allowed to fall to a withdrawal conveyor 71 located below by expanding the filling section 13. Alternatively, the cast product 12 can be withdrawn when the filling section 13 is located in a horizontal position.

The withdrawal unit 70 of this type comprises a rotary shaft 72 rotated with a motor 21, a vacuum cam 73 fixed on the rotary shaft 72, a transmission rod 74 shaken by the vacuum cam rotation, and a vacuum body 75 placed on the edge of the transmission rod 74.

The rotary shaft 72 is rotated with the same motor 21 in use for driving the transfer conveyor 20 in such a way that each of the other units are synchronized.

The vacuum cam 73 serves as a front cam fixed on the rotary shaft 72.

The vacuum unit 75 is connected with vacuum source 76, and is used for maintaining a vacuum chamber 77 inside the vacuum unit 75 in a vacuum state.

The vacuum source 76 is composed of a vacuum pump, a valve and a pressure gauge, though the detailed drawings are not shown.

The vacuum chamber 77 has the size of covering the filling section 13 in that the product 12 is contained. A cushion 78 is placed on the upper surface of the inside of the vacuum chamber 77.

The action of the withdrawal unit 70 is as follows. First, the material 11 inside the filling section 13 is solidified in the solidifying unit 60, and afterwards is turned around by the pulley 23. Then, the transfer conveyor 20 intermittently moves so that the filling section 13 containing the solidified product is positioned above the fixing sheet.

The vacuum chamber 77 now covers the filling section 13, and the inside of the vacuum chamber 77 is evacuated by the vacuum source 76. Thus, the elastic mould 10 made of an elastic body expands so that it contacts with the inside wall of the vacuum chamber 77. At the same time the fixing member 14 as well as the filling section 13 of the elastic mould 10 comes in intimate contact with the inside of the vacuum chamber 77, and an opening is shaped around the fixing hole 25 of the fixing sheet 24.

Then, the product 12 leaves the elastic mould 10 and falls down through the fixing hole 25 of the fixing sheet 24, the hole being larger than the product 12. The product is then transferred to a specified position by a withdrawal conveyor 71 placed below the withdrawal unit 70.

When a vacuum is applied to the mould 10 positioned in the vacuum chamber 77 as shown in FIG. 4, the product may collide with the upper surface of the inside of the vacuum chamber 77 to result in possible deformation. In the example as shown above, however, the cushion 78 is attached to the upper surface of the inside of the vacuum chamber 77 to prevent such deformation.

Figure 5:
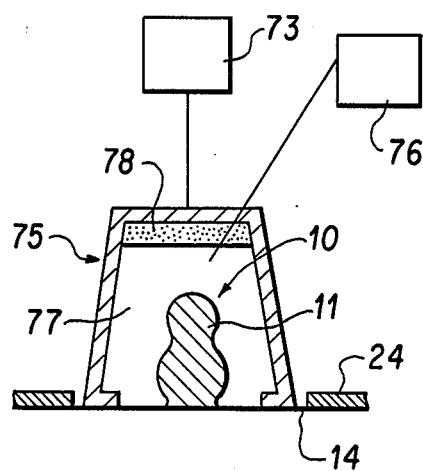
FIG. 5 illustrates an alternate withdrawal unit.

Although the drawing shown as an example of a cylindrical vacuum chamber 77 with an end cap, a totally or partially tapered chamber as shown by FIG. 5 is preferred because such shape permits a free falling of the product from the inside of the vacuum chamber 77.

Since the whole shape of the cast product 12 thus produced is determined by that of the filling section 13 of the elastic mould 10, any shapes of cast products 12 can be produced by preparing a variety of elastic moulds.

Compared with those moulds made of a rigid body, the elastic mould 10 can be mass-produced at low costs. In addition to the cost advantage of the cast product 12, the product of the present invention has no such joint as appears in that produced by means of a split mould so that there can be obtained a natural-looking and high-value product. Furthermore, production steps can be simplified because no splits of the mould into a plurality of directions are required.

Furthermore, since the filling into the elastic mould 10 is carried out when the elastic mould 10 is placed under vacuum, almost no air is present inside the filling section 13 of open-bag shape at the stage of filling. Therefore air bubble entrainment or formation in the filling material 11 filled into the filling section 13 can be prevented simply by maintaining the filling material 11 free from the air before the filling starts.

In addition, the filling section 13 of open-bag shape can be expanded by applying more vacuum in the opposite side of the opening of the elastic mould 10 than in the inside of the elastic mould of open-bag shape. The filling of the filling material 11 is carried out into the mould thus expanded, and afterwards the elastic mould 10 returns to the original size by equalizing the degrees of vacuum in both sides slowly after or during the filling steps. This action beneficially permits the filling into the mould of more elaborate shape.

The elastic mould 10 can expand and contract as the volume of the filling material 11 changes in the solidification step in the solidification unit 60. Hence, the elastic mould 10 will not break at all.

Furthermore, the shape of the product 12 will not suffer damaged in the withdrawal step, since a vacuum is used for gently withdrawing the product 12 in the withdrawal unit 70.

It should be noted in the above description that the elastic mould 10 can be any elastic material including soft rubber and soft plastic. As long as it is elastic, any material can be used for the mould.

As described in detail herein, the open-bag shaped mould of the present invention provides products without joints, low production costs of the mould itself, prevention of mould breakage as well as a great degree of production step simplification. In addition, regardless of its viscosity, the filling material can be filled into the inside of the elastic mould without air bubbles trapped in the filling material.

What is claimed is:

1. Apparatus for producing cast products comprising: a filling unit wherein a non-solid material is filled into an elastic mould having an open bag-shaped filling section, said filling unit including an upper cover and a lower cover movable to positions enclosing said elastic mould and means for evacuating said upper cover and said lower cover at said filling unit, a solidifying unit wherein the filled material is solidified inside the elastic mould, a withdrawal unit wherein the solidified product is withdrawn from the inside of the elastic mould, and conveying means for moving said elastic mould from said filling unit to said solidifying unit and said withdrawal unit, whereby said upper cover is moved to enclose an upper portion of said elastic mould and evacuated to withdraw air from the interior of said bag-shaped filling section and said lower cover is moved to enclose a lower part of said elastic mould and evacuated to expand said bag-shaped filling section.

2. Apparatus for producing cast products according to claim 1, wherein the elastic mould includes a flange extending from an open end of the bag-shaped filling section and said elastic mould is fixed to said conveying means for moving said elastic mould by said flange.

3. Apparatus for producing cast products according to claim 1, wherein said lower cover is movable to a position enclosing the filling section of said elastic mould, said upper cover is movable to a position enclosing an open end of the filling section of said elastic mould, and said means for evacuating said upper and lower covers is selectively operable to apply more vacuum to said lower cover to expand said filling section than to said upper cover.

4. Apparatus for producing cast products according to claim 1, wherein the withdrawal unit includes a vacuum chamber, a vacuum source connected to said vacuum chamber and means for moving said vacuum chamber to surround said bag-shaped filling section of said elastic mould whereby said vacuum source may be applied to said vacuum chamber to expand said elastic mould and permit withdrawal of the solidified filled material therein.

5. Apparatus for producing cast products according to claim 4, wherein the interior of said vacuum chamber is tapered from a greater width near an open end of said bag-shaped filling section to a lesser width near a closed end of said bag-shaped filling section.

* * * * *